(12) United States Patent
Telpaz et al.

(10) Patent No.: US 12,481,940 B2
(45) Date of Patent: Nov. 25, 2025

(54) RESOURCE SHARING AMONG VEHICLE FLEETS USING BIDDING MECHANISM

(71) Applicant: GM GLOBAL TECHNOLOGY OPERATIONS LLC, Detroit, MI (US)

(72) Inventors: Ariel Telpaz, Givat Haim Meuhad (IL); Zahy Bnaya, Petach Tikva (IL); Refael Blanca, West Bloomfield Township, MI (US); Nadav Baron, Hod Hasharon (IL); Neeraj R. Gautama, Whitby (CA); Laura Chmielewski, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 18/355,014

(22) Filed: Jul. 19, 2023

(65) Prior Publication Data

US 2025/0029026 A1 Jan. 23, 2025

(51) Int. Cl.
*G06Q 10/0631* (2023.01)
*G06Q 10/04* (2023.01)
*G06Q 30/0283* (2023.01)
*G06Q 30/08* (2012.01)

(52) U.S. Cl.
CPC ....... *G06Q 10/06311* (2013.01); *G06Q 10/04* (2013.01); *G06Q 30/0283* (2013.01); *G06Q 30/08* (2013.01)

(58) Field of Classification Search
CPC ............. G06Q 10/06311; G06Q 10/04; G06Q 30/0283; G06Q 30/08
See application file for complete search history.

(56) References Cited

U.S. PATENT DOCUMENTS

| | | | |
|---|---|---|---|
| 8,036,950 B1* | 10/2011 | Schneur | G06Q 10/087 705/26.4 |
| 2016/0104111 A1* | 4/2016 | Jones | G06Q 30/0611 705/26.4 |
| 2021/0064058 A1* | 3/2021 | Abari | G05D 1/0291 |
| 2022/0171386 A1* | 6/2022 | Cui | G06Q 10/101 |
| 2022/0250654 A1* | 8/2022 | Zhang | G08G 1/20 |

OTHER PUBLICATIONS

A. Y. S. Lam, "Combinatorial Auction-Based Pricing for Multi-Tenant Autonomous Vehicle Public Transportation System, " in IEEE Transactions on Intelligent Transportation Systems, vol. 17, No. 3, pp. 859-869, Mar. 2016 (Year: 2016).*

* cited by examiner

*Primary Examiner* — Stephanie Z Delich
(74) *Attorney, Agent, or Firm* — Quinn IP Law (57) ABSTRACT

A system and method for resource sharing among vehicle fleets using a bidding mechanism is presented. A fleet scheduler generates a bidding proposal for one or more unassigned tasks associated with a first fleet of vehicles, where the bidding proposal is associated with a second fleet of vehicles associated with an excess quantity of resources. An online platform receives the bidding proposal for the one or more unassigned tasks and determines, using the bidding proposal and based on an auctioning scheme, one or more winning bids. The one or more winning bids includes assigning the one or more unassigned tasks from the first fleet of vehicles to the second fleet of vehicles with the excess quantity of resources.

20 Claims, 5 Drawing Sheets

RESOURCE SHARING AMONG VEHICLE FLEETS USING BIDDING MECHANISM

INTRODUCTION

Vehicles are rapidly integrating ever increasing technological components into their systems. Special use microcontrollers, technologies, and sensors may be used in many different applications in a vehicle. Automotive microcontrollers and sensors may be utilized in enhancing automated structures that offer state-of-the-art experience and services to the customers, for example in tasks such as body control, camera vision, information display, security, autonomous controls, etc. Further, such technology may be used by fleet owners to assist in their operations.

In addition, some fleet operators may have underutilized resources in terms of vehicles and drivers. Other fleet operators may have overutilized resources in terms of excess tasks. Optimal utilization of vehicles and drivers is critical for efficient fleet operations. Utilization of resources may not be consistent and may fluctuate based on demand. Sharing resources between fleets within a geographic proximity may help with compensating for such fluctuations.

SUMMARY

Disclosed herein is a system and method for resource sharing among vehicle fleets using a bidding mechanism. Real time data from vehicles may be used as a basis for machine learning price estimation for tasks where underutilized fleets, based on vehicle data such as body type, towing capacity, range, etc., may predict a task completion cost.

Thus, a system for resource sharing among vehicle fleets using a bidding mechanism may include a first fleet of vehicles, wherein the first fleet of vehicles may be associated with one or more unassigned tasks. In addition, a second fleet of vehicles may be associated with an excess quantity of resources. The system may also include a fleet scheduler for the second fleet of vehicles that may generate a bidding proposal for the one or more unassigned tasks. The system may include an online platform that may receive, from the fleet scheduler, the bidding proposal for the one or more unassigned tasks and, based on an auctioning scheme, using the bidding proposal, may determine one or more winning bids, wherein the one or more winning bids may include assigning the one or more unassigned tasks from the first fleet of vehicles to the second fleet of vehicles with the excess quantity of resources.

Another aspect of the disclosure may include where the bidding proposal is based on a price estimate of the one or more unassigned tasks of the first fleet of vehicles.

Another aspect of the disclosure may include where the price estimate is based upon vehicle data, driver data, and task data associated with the second fleet of vehicles.

Another aspect of the disclosure may include where the vehicle data comprises a body type, a towing capacity, a range, and a distance from a start location.

Another aspect of the disclosure may include where the fleet scheduler for the second fleet of vehicles is further configured to determine an optimal schedule for the second fleet of vehicles.

Another aspect of the disclosure may include where the fleet scheduler is associated with a driver and vehicle pool.

Another aspect of the disclosure may include where the driver and vehicle pool are associated with data that may include a driver availability, a driver score and skill set, an availability of vehicles, and an initial requested price per driver and vehicle usage.

Another aspect of the disclosure may include where the fleet scheduler is associated with a task pool.

Another aspect of the disclosure may include where the task pool is associated with data that may include one or more task characteristics and an initial proposed payment for completing a task.

Another aspect of the disclosure may include where the fleet scheduler may be optimized for a task scheduling by bidding for a driver and a vehicle.

Another aspect of the disclosure may include where the fleet scheduler is optimized for driver scheduling by bidding for a task.

Another aspect of the disclosure may include where the online platform includes a fleet coordinator.

Another aspect of the disclosure may include a simulation system that may simulate a schedule based on one or more bidding actions.

Another aspect of the disclosure may include a fleet manager including a budget constraint and a weight on spending versus scheduling optimization.

Another aspect of the disclosure may include a method for resource sharing among vehicle fleets using a bidding mechanism that may include generating, by a fleet scheduler, a bidding proposal for one or more unassigned tasks associated with a first fleet of vehicles, where the bidding proposal may be associated with a second fleet of vehicles associated with an excess quantity of resources. The method may also include receiving, by an online platform, the bidding proposal for the one or more unassigned tasks and then determine, by the online platform, using the bidding proposal and based on an auctioning scheme, one or more winning bids, where the one or more winning bids may include assigning the one or more unassigned tasks from the first fleet of vehicles to the second fleet of vehicles with the excess quantity of resources.

Another aspect of the method may include determining, by the fleet scheduler, an optimal schedule for the second fleet of vehicles.

Another aspect of the method may include determining that the optimal schedule is based on an optimization for a task scheduling by bidding for a driver and a vehicle.

Another aspect of the method may include where the determining the optimal schedule is based on an optimization for driver scheduling by bidding for a task.

Another aspect of the method may include where the auctioning scheme is based on a Vickery-Clarke-Groves mechanism or a Dutch auction mechanism.

Another aspect of the disclosure may include a system for resource sharing among vehicle fleets using a bidding mechanism that may include a first fleet of vehicles, where the first fleet of vehicles is associated with one or more unassigned tasks. The system may also include a second fleet of vehicles, wherein the second fleet of vehicles is associated with an excess quantity of resources. The system may also include a fleet scheduler for the second fleet of vehicles that may generate a bidding proposal for the one or more unassigned tasks. The system may also include an online platform that may receive, from the fleet scheduler, the bidding proposal for the one or more unassigned tasks and then, based on an auctioning scheme, using the bidding proposal, may determine one or more winning bids, where the one or more winning bids includes assigning the one or more unassigned tasks from the first fleet of vehicles to the second fleet of vehicles with the excess quantity of resources. The system may also include a simulation system configured to simulate a schedule based on one or more bidding actions and a fleet manager that may include a budget constraint and a weight on spending versus scheduling optimization. The system may include where the bidding proposal is based on a price estimate of the one or more unassigned tasks of the first fleet of vehicles. The system may include wherein the price estimate is based upon vehicle data, driver data, and task data associated with the second fleet of vehicles. The system may include where the vehicle data includes a body type, a towing capacity, a range, and a distance from a start location. The system may include where the fleet scheduler for the second fleet of vehicles may determine an optimal schedule for the second fleet of vehicles. The system may include where the fleet scheduler is associated with a driver and vehicle pool. The system may include where the driver and vehicle pool are associated with data including driver availability, a driver score and skill set, an availability of vehicles, and an initial requested price per driver and vehicle usage. The system may include where the fleet scheduler is associated with a task pool. The system may include where the task pool is associated with data including one or more task characteristics and an initial proposed payment for completing a task. The system may include where the fleet scheduler is optimized for a task scheduling by bidding for a driver and a vehicle, or where the fleet scheduler is optimized for driver scheduling by bidding for a task. The system may include where the online platform includes a fleet coordinator.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
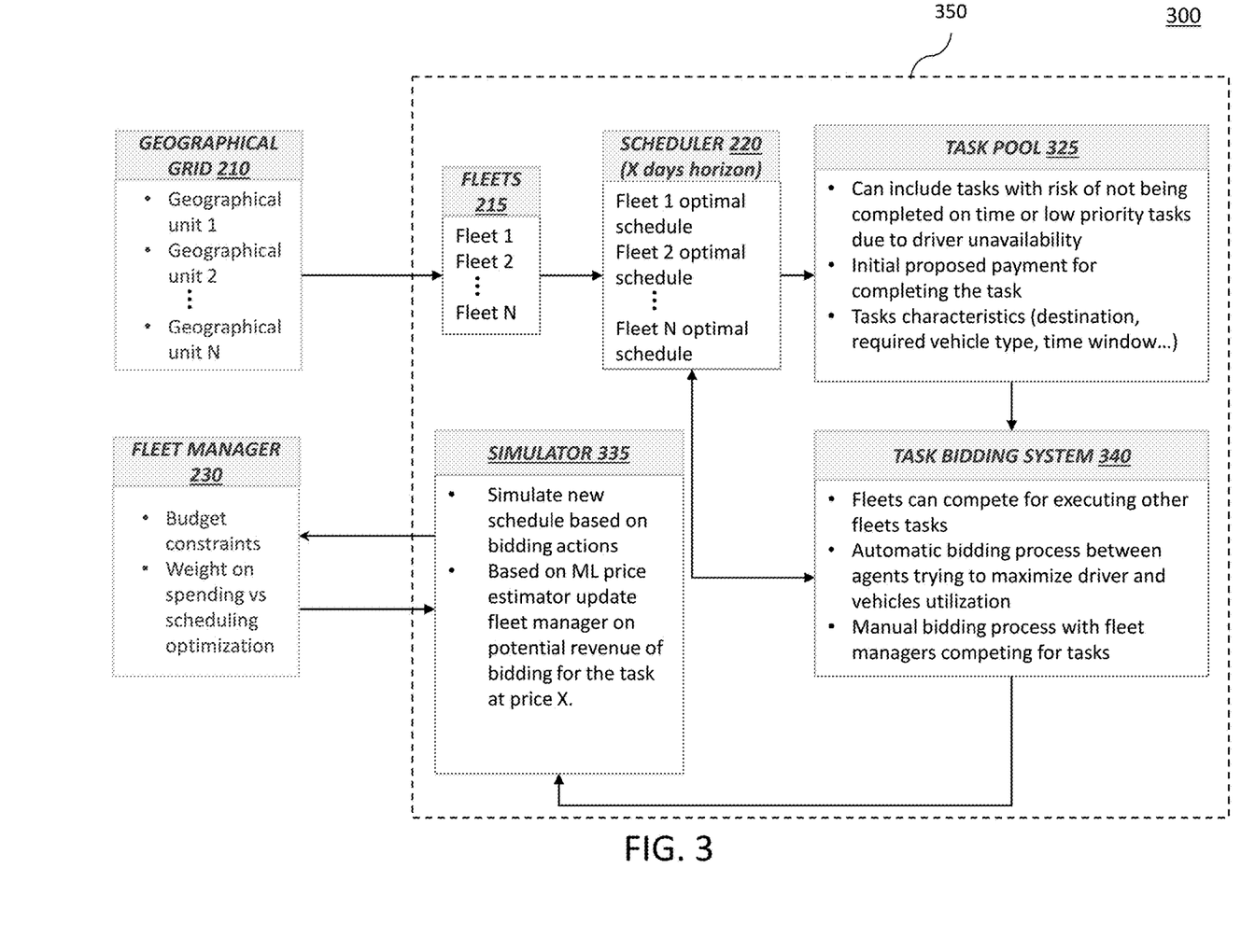
FIG. 3 is a flowchart of a system for resource sharing among vehicle fleets of optimizing driver scheduling by bidding for tasks, in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Vehicles have become computationally advanced and equipped with multiple microcontrollers, sensors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and rear automatic braking may depend on information obtained from cameras and sensors on a vehicle. Such systems may also provide a wealth of information of the vehicle, including, for example, location, automatic assistance sensors, occupancy data, motion sensors, to name a few. These systems may also provide detailed information as to the operation of a vehicle, information that may not be aware of by its occupants. Such information may be compiled, through the cloud, onto an online platform for further analysis. For example, a fleet owner may collect vehicle data for a particular driver to ascertain that driver's driving style and habits to determine a driver profile.

Fleet operators may constantly face issues of resource and task allocation. Too many unassigned tasks may mean overutilized fleet resources. Too few unassigned tasks may mean an underutilized fleet. An online platform may be used to balance tasks and resources between fleet managers utilizing an online platform with an auction system. Such a system may then allow for assigning some or all of the unassigned tasks from one fleet of vehicles to another fleet of vehicles with an excess quantity of resources. Such auctioning of tasks and resources may also be based on optimizing schedules based on vehicle status data that may be collected using a vehicle fleet telemetry system.

Figure 1:
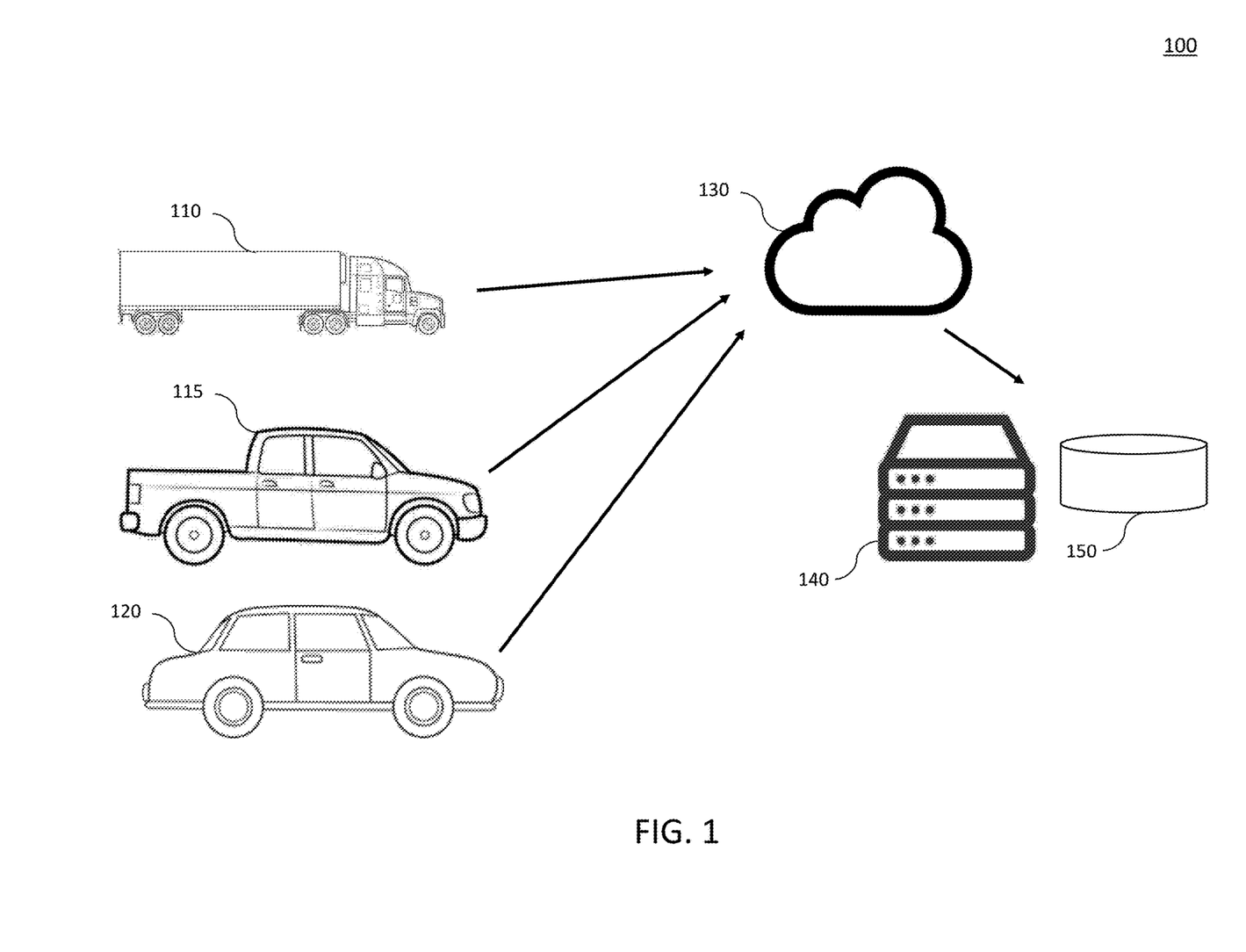
FIG. 1 is an illustration of a vehicle fleet telemetry system, in accordance with the disclosure.

FIG. 1 is an illustration of a vehicle fleet telemetry system 100, according to an embodiment of the present disclosure. System 100 may include a fleet of vehicles including different types and styles of vehicles, for example a tractor-trailer 110, a truck 115, or a two door or four door sedan 120 or other type of vehicles. The vehicle may communicate through the Internet, for example as shown by cloud 130, to an online platform 140 that includes storage 150. System 100 may be structured such that vehicles, for example tractor-trailer 110, truck 115, or the sedan 120, through internal sensors, controllers, and processors may gather information regarding the driver's driving performance and vehicle data. Drive information may include trips data that may be analyzed for attributes such as aggressiveness, fuel/energy efficiency, and associated maintenance costs based on the type of vehicle being driven and the types of roads on which the vehicle travels. Vehicle information may include data such as the body type, towing capacity, number of passenger seats, the type of drive train, electric vehicle status, location, etc. Such information may then be sent through the cloud 130 to servers, such as the online platform 140 and storage 150. Also, a history of trips may be stored in storage 150 for further analysis.

Figure 2:
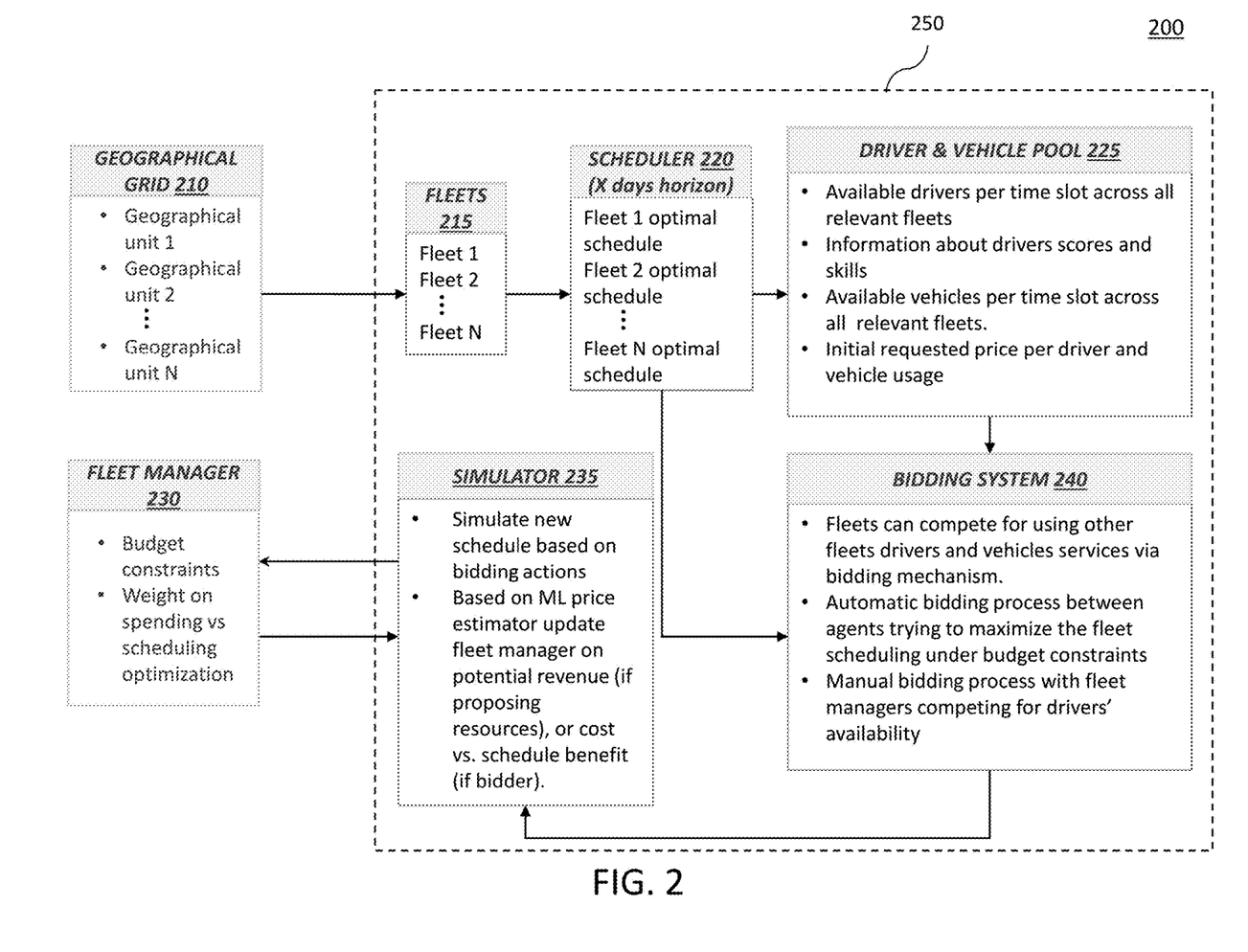
FIG. 2 is a flowchart of a system for resource sharing among vehicle fleets of optimizing task scheduling by bidding for drivers and vehicles, in accordance with the disclosure.

FIG. 2 illustrates a flowchart of a system 200 for optimizing task scheduling by bidding for drivers and vehicles, according to an embodiment of the present disclosure. System 200 may include a fleet coordinator 250, a geographical grid 210, and a fleet manager 230. Fleet coordinator 250 may also include fleets 215, a scheduler 220, a driver and vehicle pool 225, a simulator 235, and a bidding system 240.

System 200 may be broken down or segmented according to a geographical grid 210. The grid may be defined in different ways, for example by map coordinates, by areas such as zip code, or other metrics. The goal of the geographical grid 210 includes mapping the proximity of resources, such as from the driver and vehicle pool 225 with the vehicle fleets, which may be analyzed on each of the geographical units, e.g., geographical unit 1, geographical unit 2, through geographical unit N.

As a single entity, fleet coordinator 250 may optimize a schedule of all fleets, e.g., fleet 1, fleet 2, through fleet N in fleets 215, using scheduler 220 that may determine an optimal schedule for each fleet on a horizon of X days, given that X may be a number or fraction of days. Given each optimal schedule, e.g., fleet 1 optimal schedule, fleet 2 optimal schedule, through fleet N optimal schedule, the scheduler 220 may then automatically allocate available drivers and vehicles to the driver and vehicle pool 225. Driver and vehicle pool 225 may also be referred to as a marketplace that may enable other fleets to bid for the unassigned resources. The driver and vehicle pool 225, based on the scheduler 220, may determine both the available drivers and vehicles per time slot across all relevant fleets. Information about the drivers and their skill sets may also be matched, either manually or automatically, to the needs of interested bidders of the available resources.

Bidding system 240, with the output of the scheduler 220 and the driver and vehicle pool 225 may then allow fleets with excess or unassigned tasks to bid for the available driver and vehicle resources. Fleets may compete for using other fleets drivers and vehicles via the bidding system 240.

Further, the bidding process may be accomplished automatically through fleet agents trying to maximize their fleet scheduling under budget constraints. In addition, the bidding process may be accomplished manually by fleet managers. As the bidding process commences, scheduler 220 may further optimize each fleet's optimal schedule. Further, the optimization process may be iterative as the bidding system 240 continues to receive bids.

Simulator 235 may then simulate scheduling based on fleet drivers and vehicles being used through the bidding actions. In addition, based on a machine learning price estimator, a fleet manager may be updated on potential revenue, if proposing resources, or if the fleet manager is a bidder, then cost versus scheduling benefits may be analyzed.

The machine learning price estimator may take as inputs data from each fleet vehicle, which may be transmitted by the fleet vehicle in real time. Such inputs may include vehicle data such as the body type, towing capacity, number of passenger seats, the type of drive train, current range of the vehicle, electric vehicle charge capacity (if applicable), and the distance from the start location of a task. Other inputs may include driver information such as a driver score or skill set. Task information may also be an input to the machine learning price estimator and include data such as a start time and location for a task, a task duration, distance to be traveled, and an estimate of the fuel or energy to be used. These inputs may then be used by a machine learning regressor model on a continuous variable prediction using regression analysis, boosting methods, or neural networks. The output of the machine learning regressor model may be a predicted task completion cost that may be used as an estimate for an initial task price calibration that may be used in the bidding price proposal.

Fleet manager 230, based on interactive communications with the simulator 235 may impose budget constraints or weights on spending versus scheduling optimization for use by the simulator 235.

FIG. 3 illustrates a flowchart of a system 300 for optimizing driver scheduling by bidding for tasks, according to an embodiment of the present disclosure. System 300 may include a fleet coordinator 350, the geographical grid 210, and the fleet manager 230. Fleet coordinator 350 may also include fleets 215, scheduler 220, a task pool 325, a simulator 335, and a task bidding system 340.

System 300 may be broken down or segmented according to a geographical grid 210 as discussed in system 200. As a single entity, fleet coordinator 350 may optimize a schedule of all fleets, e.g., fleet 1, fleet 2, through fleet N in fleets 215, using scheduler 220 that may determine the optimal schedule for each fleet on a horizon of X days, given that X may be a number or fraction of days.

In optimizing driver scheduling by bidding for tasks, the task pool 325, based on the scheduler 220, may include tasks with risk of not being completed on time or have a low priority due to driver or vehicle unavailability. As with system 200, system 300 may use a machine learning based price estimator to be used to determine an initial proposed payment for completing a task based on the task requirements, for example, the required destination, required vehicle type, time frame, etc.

The task bidding system 340, with the output of the scheduler 220 and the task pool 325 may then allow fleets with excess resources to bid for executing other fleets tasks. Fleets may compete for other fleets tasks via the task bidding system 340. Further, the bidding process may be accomplished automatically through fleet agents trying to maximize driver and vehicle utilization. In addition, the bidding process may be accomplished manually by fleet managers competing for tasks. As the bidding process commences scheduler 220 may further optimize each fleet's previous optimal schedule. Further, the optimization process may be iterative as the bidding system 340 updates schedules based on tasks won during the bidding process.

Simulator 335 may then simulate scheduling based on tasks being acquired through the bidding actions. In addition, as discussed in system 200, system 300 with simulator 335, based on a machine learning price estimator, may update a fleet manager on potential revenue of bidding for a particular task at a particular price.

Fleet manager 230, based on interactive communications with the simulator 335 may impose budget constraints or weights on spending versus scheduling optimization for use by the simulator 335.

Task bidding system 340 may produce a combinatorial auction as a mechanism for bidding for multiple tasks simultaneously. Stage one of the mechanism may include determining one or more resources availability windows. Thus, state one may include determining, for each resource in the fleet an availability window that may include an initial location and start time along with an estimated end location and end time.

Stage two may include examining the tasks pool that may include obtaining information on task requirements and duration for each task in the task pool 325. For example, for task #1, a source location and start time, a duration, and a goal location and end time. The same would apply for task #2, task #3, etc.

Stage three may include a simulated scheduling with pool tasks that may include, given the available resources, possible grouping of tasks during the availability window from stage 1 based on a price and cost estimator, such as the machine learning regressor model previously discussed.

Figure 4:
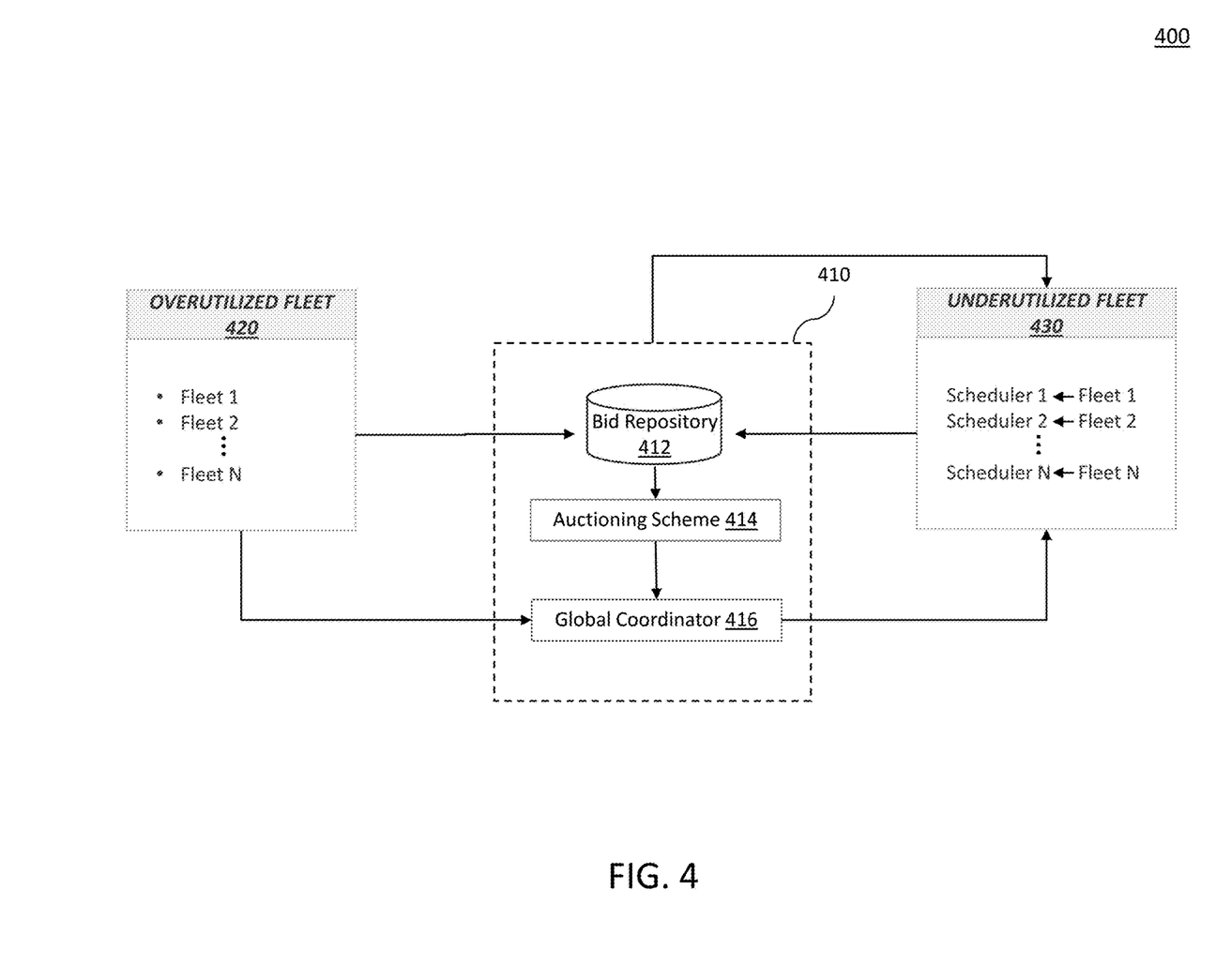
FIG. 4 is a fleet resource auction system, in accordance with the disclosure.

FIG. 4 illustrates a fleet resource auction system 400, according to an embodiment of the present disclosure. Fleet resource auction system 400 may include auction system 410, an overutilized fleet 420, and an underutilized fleet 430. Auction system 410 may include a bid repository 412, an auctioning scheme 414, and a global coordinator 416.

Overutilized fleet 420 may include multiple fleets, for example, as shown by fleet 1, fleet 2, through fleet N. Overutilized fleet 420 may be associated with one or more unassigned tasks, that due to a lack of resources, low priority, or the like, have not been completed. Each unassigned task may also be associated with a start and end location, a start time, an end time, and associated duration.

Underutilized fleet 430 may include multiple fleets, for example, as shown by fleet 1, fleet 2, through fleet N. Underutilized fleet 430 may be associated with one or more available resources as indicated by scheduler 1, scheduler 2, through scheduler N, each scheduler associated with its corresponding fleet and indicative of the availability of each fleet resource.

Auction system 410 may accept input into its bid repository 412 one or more unassigned tasks from the overutilized fleet 420 and bids from underutilized fleet 430. Bids from underutilized fleet 430 may be based on driver and vehicle availability, times, and locations as indicated by each scheduler. As previously discussed, each bid from the schedulers may be based on a price estimate using vehicle data, driver data, and task data associated with the fleet resources.

Once bid repository 412 is in receipt of the unassigned tasks from overutilized fleet 420 and initial bids from the schedulers of underutilized fleet 430, auctioning scheme 414 may use methodologies such as a Vickrey-Clarke-Groves mechanism or a Dutch Auction to determine one or more winning bids. Global coordinator 416, based on winning bids from auctioning scheme 414 may then allocate the unassigned tasks from overutilized fleet 420 and assign them to the corresponding winning fleet within the underutilized fleet 430. Global coordinator 416 may also make scheduling modification recommendations between the fleets within the underutilized fleet 430. For example, global coordinator 416 may recommend allocating a first task to Driver B and another task to Driver A in order to enable Driver B to complete a different third task. Such recommendation may be accomplished using a potential algorithmic solution based on job-shop scheduling solvers such as Johnson's algorithm.

Figure 5:
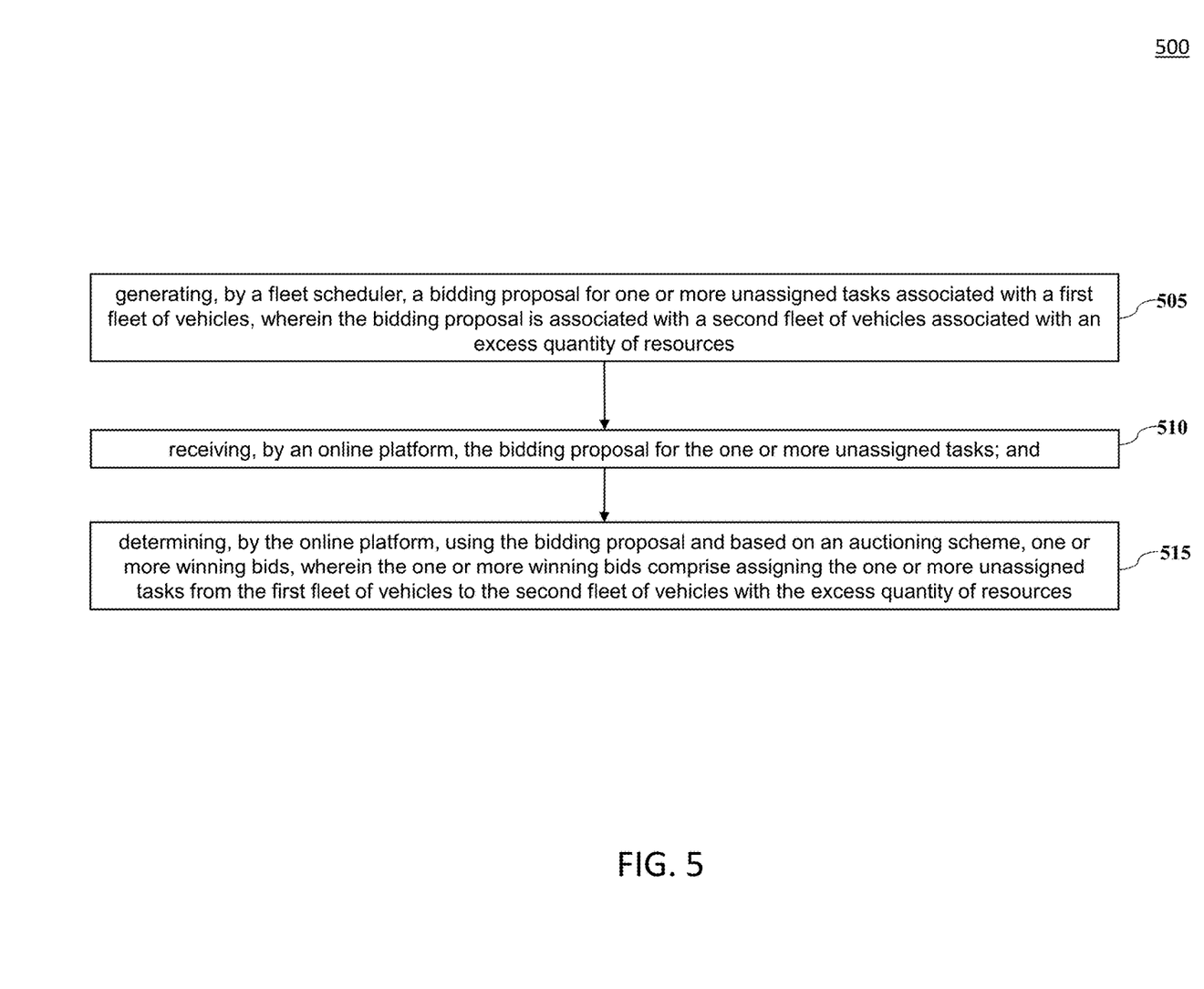
FIG. 5 is a flowchart of a method for resource sharing among vehicle fleets using a bidding mechanism, in accordance with the disclosure.

FIG. 5 shows an exemplary embodiment of a method 500 for resource sharing among vehicle fleets using a bidding mechanism, according to an embodiment of the present disclosure. Method 500 begins at step 505 with generating, by a fleet scheduler, a bidding proposal for one or more unassigned tasks associated with a first fleet of vehicles, wherein the bidding proposal is associated with a second fleet of vehicles associated with an excess quantity of resources.

As discussed in FIG. 3, a fleet coordinator 350 may optimize a schedule of all fleets, e.g., fleet 1, fleet 2, through fleet N in fleets 215, using scheduler 220 that may determine an optimal schedule for each fleet on a horizon of X days, given that X may be a number or fraction of days. System 300 also may include a process of optimizing driver scheduling by bidding for tasks, the task pool 325, based on the scheduler 220, may include tasks with risk of not being completed on time or have a low priority due to driver or vehicle unavailability. As with system 200, system 300 may use a machine learning based price estimator to be used to determine an initial proposed payment for completing a task based on the task requirements, for example, the required destination, required vehicle type, time frame, etc.

At step 510 the online platform may receive the bidding proposal for the one or more unassigned tasks. As discussed in FIG. 4, the auction system 410 may accept inputs into its bid repository 412 of one or more unassigned tasks from the overutilized fleet 420 and bids from underutilized fleet 430. Bids from underutilized fleet 430 may be based on driver and vehicle availability, times, and locations as indicated by each scheduler. As discussed, each bid from the schedulers may be based on a price estimate using vehicle data, driver data, and task data associated with the fleet resources.

At step 515 the online platform may determine, using the bidding proposal and based on an auctioning scheme, one or more winning bids, wherein the one or more winning bids includes assigning the one or more unassigned tasks from the first fleet of vehicles to the second fleet of vehicles with the excess quantity of resources. As discussed in FIG. 4, Once bid, repository 412 is in receipt of the unassigned tasks from overutilized fleet 420 and initial bids from the schedulers of underutilized fleet 430 then auctioning scheme 414 may use methodologies such as a Vickrey-Clarke-Groves mechanism or a Dutch Auction to determine one or more winning bids. Global coordinator 416, based on winning bids from auctioning scheme 414, then allocates the unassigned tasks from overutilized fleet 420 and assigns them to the corresponding winning fleet within the underutilized fleet 430.

Method 500 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed:

1. A system for resource sharing among vehicle fleets, the system comprising:
   a first fleet of vehicles associated with one or more unassigned tasks having task locations within a first geographic region, each first motor vehicle in the first fleet of vehicles including a first microcontroller connected to a first set of on-vehicle sensors;
   a second fleet of vehicles associated with an excess quantity of resources and having vehicle locations within a second geographic region, each second motor vehicle in the second fleet of vehicles including a second microcontroller connected to a second set of on-vehicle sensors;
   a vehicle fleet telemetry system including a data storage repository and a system server wirelessly connected to the first and second fleets of vehicles, the vehicle fleet telemetry system containing:
   a fleet scheduler configured to:
      receive, from the second microcontrollers and the second set of on-vehicle sensors of the second motor vehicles, vehicle telemetry data containing driver data and vehicle data indicative of the excess quantity of resources; and
      generate, using the vehicle telemetry data, a bidding proposal for the one or more unassigned tasks associated with the first fleet of vehicles; and
   an online platform configured to:
      receive, from the fleet scheduler, the bidding proposal for the one or more unassigned tasks;
      map the task locations and the vehicle locations within a predefined geographic grid to identify which of the second motor vehicles within the second fleet of vehicles are within proximity to the one or more unassigned tasks;
      determine, based on an auctioning scheme using the bidding proposal and the second motor vehicles within proximity to the one or more unassigned tasks, one or more winning bids;
      assign, based on the one or more winning bids, the one or more unassigned tasks from the first fleet of vehicles to the second fleet of vehicles with the excess quantity of resources; and
      commanding, through the fleet scheduler, one or more of the second motor vehicles in the second fleet of vehicles to complete each task in the one or more unassigned tasks with instructions for completing the task.

2. The system of claim 1, wherein the bidding proposal is based on a price estimate of the one or more unassigned tasks of the first fleet of vehicles.

3. The system of claim 2, wherein the price estimate is derived by a machine-learning (ML) price estimator using an ML regressor model on a continuous variable prediction based upon the vehicle data, the driver data, and task data received in real-time from the second motor vehicles in the second fleet of vehicles.

4. The system of claim 3, wherein the vehicle data comprises a body type, a towing capacity, a range, and a distance from a start location.

5. The system of claim 1, wherein the fleet scheduler for the second fleet of vehicles is further configured to:
   determine an optimal schedule for the second fleet of vehicles; and
   allocate, based on the optimal schedule, select vehicles from the second fleet of vehicles to a vehicle pool, wherein generating the bidding proposal is based on the vehicles allocated to the vehicle pool.

6. The system of claim 1, wherein the fleet scheduler is associated with a driver and vehicle pool configured to identify a set of available drivers and vehicles per time slot across the second fleet of vehicles.

7. The system of claim 6, wherein the driver and vehicle pool is associated with data comprising a driver availability, a driver score and skill set, an availability of vehicles, and an initial requested price per driver and vehicle usage.

8. The system of claim 1, wherein the fleet scheduler is associated with a task pool configured to optimize driver scheduling of drivers of the second fleet of vehicles for completing tasks in the task pool based on a task requirement and a task duration for each of the tasks in the task pool.

9. The system of claim 8, wherein the task pool is associated with data comprising one or more task characteristics and an initial proposed payment for completing a task.

10. The system of claim 1, wherein the fleet scheduler is optimized for a task scheduling by bidding for a driver and a vehicle.

11. The system of claim 1, wherein the fleet scheduler is optimized for driver scheduling by bidding for a task.

12. The system of claim 1, wherein the online platform comprises a fleet coordinator configured to coordinate with the fleet scheduler to optimize a schedule of the second fleet of vehicles on a predefined horizon of days.

13. The system of claim 1, further comprising a simulation system configured to simulate a schedule for drivers of the second fleet of vehicles based on one or more bidding actions within the bidding proposal.

14. The system of claim 1, further comprising a fleet manager comprising a budget constraint and a weight on spending versus scheduling optimization.

15. A method for resource sharing among vehicle fleets using a bidding mechanism, the method comprising:
   collecting, via a first fleet of vehicles using a first microcontroller and a first set of sensors of each first motor vehicle in the first fleet of vehicles, driver data and vehicle data for the first fleet of vehicles;
   collecting, via a second fleet of vehicles using a second microcontroller and a second set of sensors of each second motor vehicle in the second fleet of vehicles, driver data and vehicle data for the second fleet of vehicles;
   wirelessly connecting the first and second fleets of vehicles to a vehicle fleet telemetry system including a data storage repository and a system server, the system server containing a fleet scheduler and an online platform;
   receiving, by the fleet scheduler of the vehicle fleet telemetry system from the second motor vehicles within the second fleet of vehicles, vehicle telemetry data containing the driver data and the vehicle data indicative of an excess quantity of resources of the second fleet of vehicles;
   generating, by the fleet scheduler using the vehicle telemetry data, a bidding proposal for one or more unassigned tasks associated with a plurality of first motor vehicles within the first fleet of vehicles, the one or more unassigned tasks having task locations within a first geographic region, wherein the bidding proposal is associated with the second fleet of vehicles having vehicle locations within a second geographic region;
   receiving, by the online platform of the vehicle fleet telemetry system, the bidding proposal for the one or more unassigned tasks;
   mapping the task locations and the vehicle locations within a predefined geographic grid to identify which of the second motor vehicles within the second fleet of vehicles are within proximity to the one or more unassigned tasks;
   determining, by the online platform using the bidding proposal and based on an auctioning scheme, one or more winning bids;
   assigning the one or more unassigned tasks from the first fleet of vehicles to the second fleet of vehicles with the excess quantity of resources; and
   commanding, through the fleet scheduler, one or more of the second motor vehicles in the second fleet of vehicles to complete each task in the one or more unassigned tasks with instructions for completing the task.

16. The method of claim 15, further comprising determining, by the fleet scheduler, an optimal schedule for the second fleet of vehicles.

17. The method of claim 16, wherein the determining the optimal schedule is based on an optimization for a task scheduling by bidding for a driver and a vehicle.

18. The method of claim 16, wherein the determining the optimal schedule is based on an optimization for driver scheduling by bidding for a task.

19. The method of claim 15, wherein the auctioning scheme is based on a Vickery-Clarke-Groves mechanism or a Dutch auction mechanism.

20. A system for resource sharing among vehicle fleets, the system comprising:
   a first fleet of vehicles associated with one or more unassigned tasks having task locations within a first geographic region, each first motor vehicle in the first fleet of vehicles including a first microcontroller connected to a first set of on-vehicle sensors;
   a second fleet of vehicles associated with an excess quantity of resources and having vehicle locations within a second geographic region, each second motor vehicle in the second fleet of vehicles including a second microcontroller connected to a second set of on-vehicle sensors;
   a vehicle fleet telemetry system including a data storage repository and a system server wirelessly connected to the first and second fleets of vehicles, the vehicle fleet telemetry system containing:
   a fleet scheduler configured to:
     receive, from the second microcontrollers and the second set of on-vehicle sensors of the second motor vehicles within the second fleet of vehicles, vehicle telemetry data containing driver data and vehicle data indicative of the excess quantity of resources; and
     generate, using the vehicle telemetry data, a bidding proposal for the one or more unassigned tasks associated with the first fleet of vehicles;
   an online platform configured to:
     receive, from the fleet scheduler, the bidding proposal for the one or more unassigned tasks;
     map the task locations and the vehicle locations within a predefined geographic grid to identify which of the second motor vehicles within the second fleet of vehicles are within proximity to the one or more unassigned tasks;
     determine, based on an auctioning scheme using the bidding proposal, one or more winning bids;
     assign, based on the one or more winning bids, the one or more unassigned tasks from the first fleet of vehicles to the second fleet of vehicles with the excess quantity of resources; and
     command, through the fleet scheduler, one or more of the second motor vehicles in the second fleet of vehicles to complete each task in the one or more unassigned tasks;
   a simulation system configured to simulate a schedule based on one or more bidding actions; and
   a fleet manager comprising a budget constraint and a weight on spending versus scheduling optimization,
   wherein the bidding proposal is based on a price estimate of the one or more unassigned tasks of the first fleet of vehicles,
   wherein the price estimate is based upon vehicle data, driver data, and task data associated with the second fleet of vehicles,
   wherein the vehicle data comprises a body type, a towing capacity, a range, and a distance from a start location,
   wherein the fleet scheduler for the second fleet of vehicles is further configured to determine an optimal schedule for the second fleet of vehicles,
   wherein the fleet scheduler is associated with a driver and vehicle pool,
   wherein the driver and vehicle pool are associated with data comprising a driver availability, a driver score and skill set, an availability of vehicles, and an initial requested price per driver and vehicle usage,
   wherein the fleet scheduler is associated with a task pool, wherein the task pool is associated with data comprising one or more task characteristics and an initial proposed payment for completing a task, wherein the fleet scheduler is optimized for a task scheduling by bidding for a driver and a vehicle, or wherein the fleet scheduler is optimized for driver scheduling by bidding for a task, and wherein the online platform comprises a fleet coordinator.

* * * * *